United States Patent [19]

Weber

[11] Patent Number: 5,590,579
[45] Date of Patent: Jan. 7, 1997

[54] HYDROSTATIC PUMP AND BEARING-CLOCKING MECHANISM THEREFOR

[75] Inventor: Mark F. Weber, Eden Prairie, Minn.

[73] Assignee: Eaton Corporation, Cleveland, Ohio

[21] Appl. No.: 558,576

[22] Filed: Oct. 31, 1995

[51] Int. Cl.⁶ .................................................. F01B 3/00
[52] U.S. Cl. .................... 92/12.2; 417/269; 74/60
[58] Field of Search ............. 92/12.2, 71; 417/269; 74/60; 91/499

[56] References Cited

U.S. PATENT DOCUMENTS

| | | | |
|---|---|---|---|
| 3,803,987 | 4/1974 | Knapp | 91/506 |
| 3,908,519 | 9/1975 | Born et al. | 92/12.2 |
| 3,967,541 | 7/1976 | Born et al. | 92/12.2 |
| 4,029,367 | 6/1977 | Schwede | 308/2 R |
| 4,543,876 | 10/1985 | Heyl et al. | 91/506 |
| 4,627,330 | 12/1986 | Beck, Jr. | 92/12.2 |
| 5,024,143 | 6/1991 | Schniederjan | 92/12.2 |
| 5,226,349 | 7/1993 | Alme et al. | 91/506 |
| 5,383,391 | 1/1995 | Goade et al. | 92/12.2 |
| 5,390,584 | 2/1995 | Fritz et al. | 92/12.2 |

FOREIGN PATENT DOCUMENTS

| | | | |
|---|---|---|---|
| 74898 | 1/1961 | France | 92/12.2 |
| 3442391 | 1/1986 | Germany | 92/12.2 |

*Primary Examiner*—Thomas E. Denion
*Attorney, Agent, or Firm*—L. J. Kasper

[57] ABSTRACT

A variable displacement axial piston hydraulic unit (11) has a cradle surface (41) and a swashplate (35) with a convex surface (43). A roller bearing assembly (45) includes a bearing cage (49) defining a slot (53). Bearing clocking is accomplished by a link member (55) which is a rigid, unitarily formed member including several portions. A first portion (57) is pivotally mounted relative to the housing (13). A second portion (67) pivots and slides within an elongated slot (65) defined by the swashplate (35). A clocking portion (69) pivots and slides within the slot (53). The clocking arrangement of the present invention is simple and inexpensive, yet performs the clocking function in an extremely accurate manner.

6 Claims, 4 Drawing Sheets

5,590,579

HYDROSTATIC PUMP AND BEARING-CLOCKING MECHANISM THEREFOR

BACKGROUND OF THE DISCLOSURE

The present invention relates to variable displacement axial piston hydraulic devices of the cradle and swash type, and more particularly, to a clocking or timing mechanism for the bearing cage of a roller bearing assembly which supports the swashplate relative to the cradle.

Variable displacement axial piston devices of the type to which the present invention relates are most commonly utilized as pumps, and the invention will be described in connection therewith, although it should be understood that the invention is also applicable to variable displacement motors.

In variable displacement axial piston pumps of the type to which the invention relates, the pump housing defines a concave cradle surface, and the tiltable swashplate defines a mating, convex surface. Disposed between the cradle and the swash there is typically a pair of arcuate roller bearing assemblies, disposed on opposite transverse sides of the input shaft, each of which includes some sort of bearing cage.

As is well known to those skilled in pump art, there is a substantial axial load applied to the roller bearing set when the swash is displaced and the pump is pumping pressurized fluid, perhaps with pressures in the range of 6000 psi.

As is well known to those skilled in the bearing art, the bearing life, in this particular environment, is optimized by insuring that the roller bearings engage in a purely rolling motion with regard to both the concave cradle surface and the convex surface of the swashplate.

In order to achieve the desired rolling motion of tile bearings, the prior art cradle and swash type axial piston pumps have typically utilized what is referred to as a "bearing-clocking" mechanism, the function of which is to prevent slipping or sliding of either of the roller bearing sets, as the swashplate is displaced between its neutral position and its various displaced, operating positions. The typical prior art bearing-clocking mechanism has included a clocking member having one end pivotally connected to the pump housing and an opposite end connected to the swashplate in a manner which permits both sliding and pivotal motion therebetween. Intermediate the two ends, the clocking member is typically in engagement with, or attached to, the cage of the roller bearing assembly in a manner which also permits both sliding and pivotal movement. Examples of prior art bearing-clocking mechanisms may be seen in U.S. Pat. Nos. 4,029,367; 5,024,143; and 5,390,584.

Unfortunately, the prior art bearing-clocking mechanisms have not been totally satisfactory. For example, each of the clocking members in the above-cited patents comprises a member fabricated from wire such that the clocking member is "flexurally elastic", thus permitting some deviation of the roller bearing assembly from its desired, purely rolling relationship with both the cradle and swash.

In addition, the use of a clocking member formed from wire typically requires, in order to obtain a "slide and pivot" connection with the swashplate, that the wire member pass through a relatively close clearance hole drilled diametrally through a cylindrical swivel member, which, in turn is received within a close clearance cylindrical bore drilled in (for example) the end surface of the swashplate. The use of such a swivel member, and the required machining means that the bearing-clocking mechanism is either quite expensive to manufacture, or if manufactured inexpensively, has a substantial amount of inaccuracy associated with it. Such inaccuracy is manifested in sliding contact between the roller bearings and either the cradle or swash which, as was mentioned previously, can lead to reduced bearing life.

SUMMARY OF THE INVENTION

Accordingly, it is an object of the present invention to provide an improved bearing-clocking mechanism for an axial piston unit of the cradle and swash type which overcomes the above-described problems of the prior art, while being extremely simple and inexpensive to manufacture.

It is a related object of the present invention to provide a bearing-clocking mechanism which achieves the above-stated object, while at the same time comprising a relatively rigid member capable of performing the bearing clocking function in an extremely accurate manner, thus having the potential to improve bearing life.

The above and other objects of the invention are accomplished by the provision of an improved variable displacement axial piston hydraulic unit of the type having a housing defining a concave cradle surface. A swashplate is disposed in the housing and has a concave surface. A roller bearing assembly is disposed between the cradle surface and the convex surface, and includes a plurality of roller bearing members intended for purely rolling engagement with the cradle surface and the convex surface as the swashplate is displaced between a neutral position and a maximum displacement position. A bearing clocking mechanism includes a clocking link member in operable engagement with the housing, the swashplate, and the roller bearing assembly.

The improved hydraulic unit is characterized by the clocking link member comprising a single, rigid, unitarily formed link member including first and second end portions and a clocking portion intermediate the first and second end portions. One of the housing and the swashplate defines a transversely-oriented bore and the first portion of the link member includes a cylindrical portion disposed within the bore and closely spaced therein, permitting pivotal movement of the link member about the cylindrical portion. The other of the housing and the swashplate includes an end surface defining an elongated slot, the second portion of the link member being slidably disposed within the slot, and being configured to maintain a substantially constant, close clearance within the slot as the swashplate is displaced between the neutral position and the maximum displacement position. The roller bearing assembly includes a cage defining a slot, the clocking portion being rotatably disposed within the slot, and being configured to maintain a substantially constant, close clearance within the slot as the swashplate is displaced between the neutral position and the maximum displacement position.

In accordance with another aspect of the present invention, a method of assembling a variable displacement axial piston hydraulic unit of the type described above is provided, in which the housing defines an axis of rotation. The method is characterized by the steps of:

(a) providing the housing with a pair of transversely oriented bores disposed adjacent the cradle surface and oppositely disposed about the axis of rotation;

(b) providing a pair of clocking link members, each comprising a single, rigid, unitarily formed link member having a cylindrical first end portion, and second end portion, and a clocking portion disposed intermediate the first and second end portions. The second end portion and the clocking portion comprise generally identical cylindrical portion;

(c) orienting the housing with the concave cradle surface facing upwardly, inserting the cylindrical first end portions in the transversely-oriented bores, and orienting the clocking link members generally vertically;

(d) providing a pair of bearing assemblies, each comprising a cage defining a slot, then placing the bearing assemblies onto the cradle surface with each slot passing over its respective second end portion and into a close clearance fit with its respective clocking portion; and (e) providing a swashplate including transversely spaced apart end surfaces, each defining an elongated slot opening toward the convex surface of the swashplate, and placing the convex surface into engagement with the bearing assemblies, with each of the second end portions sliding into its respective elongated slot.

DESCRIPTION OF THE PREFERRED EMBODIMENT

Figure 1:
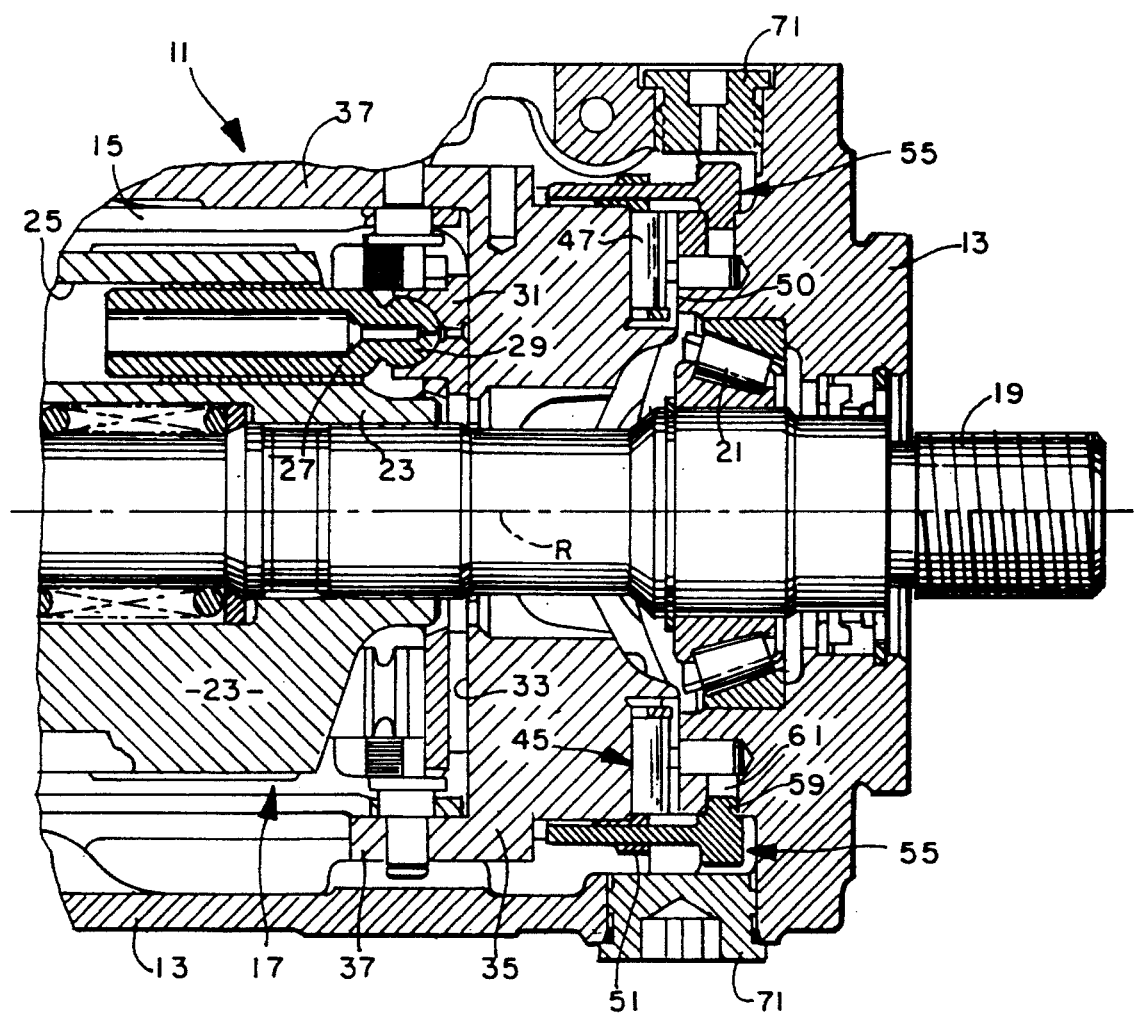
FIG. 1 is a fragmentary, axial cross-section of typical axial piston pump, including the bearing clocking mechanism of the present invention.

Referring now to the drawings, which are not intended to limit the invention, FIG. 1 is a fragmentary, axial cross-section of an axial piston pump, including the bearing clocking mechanism of the present invention.

The axial piston pump, generally designated 11, includes a main housing 13, within which is a pumping chamber 15. Within the pumping chamber 15 is a rotating group (pumping element), generally designated 17.

The rotating group 17 receives input torque from an input shaft 19, which extends through substantially the entire axial length of the pump. The input shaft 19 is suitably supported for rotation, about an axis of rotation R, relative to the main housing 13 by a number of bearing sets, only a forward bearing set 21 being shown in FIG. 1. Disposed within the pumping chamber 15, the input shaft 19 is surrounded by the rotating group 17. The rotating group 17 comprises a cylinder barrel 23, which defines a plurality of axially-oriented cylinders 25, only one of which is shown in FIG. 1. Disposed within each cylinder 25 is an axially reciprocable piston member 27, only one of which is fully illustrated in FIG. 1. Each piston member 27 includes a generally spherical head 29 which is pivotally received by a slipper member 31. The slipper members 31 ride on a transverse surface 33 of a swashplate 35, as the cylinder barrel 23 rotates relative to the rotationally-stationary swashplate 35. Although the swashplate 35 does not rotate about the axis of rotation of the input shaft 19, it is well known to those skilled in the art that the swashplate 35 may pivot or tilt about a transverse axis A (see FIGS. 2–4).

As may best be seen in FIGS. 1–4, the swashplate 35 includes, in the subject embodiment, a pair of axially extending arms 37, with each arm 37 including a cylindrical portion 39 (shown only in FIGS. 3 and 4) which is adapted to be in engagement with a servo piston (not shown herein) by means of which the swashplate 35 may be displaced or tilted. The tilting of the swashplate 35, as is well known to those skilled in the art, changes the displacement of the pump 11 from the zero displacement (neutral displacement) position shown in FIG. 2 to the maximum displacement position shown in FIG. 4, or any displacement therebetween.

Referring now primarily to FIGS. 2–6, the main housing 13 defines a concave cradle surface 41, while the swashplate 35 defines a convex surface 43, which, at least theoretically, is disposed at a constant distance, radially, from the cradle surface 41. Disposed radially between the cradle surface 41 and the convex surface 43 is a roller bearing assembly, generally designated 45, including a plurality of roller bearings 47, a cage member 49, and an outer race segment 50. The cage member 49 includes a flange portion 51, which preferably is integral with the cage member 49, but extends transversely outward, beyond the roller bearings 47, as may best be seen in FIGS. 1 and 5. The outer race segment 50 typically comprises an arcuate item of high bearing quality steel which makes it possible for the rollers 47 to operate at higher contact pressures than if they were in direct rolling contact with the cradle surface 41. One important aspect of the present invention is that the flange portion 51 defines a slot 53, the function of which will be described subsequently.

In accordance with another aspect of the invention, the bearing clocking mechanism includes a clocking link member, generally designated 55 which, in the subject embodiment, comprises a single, rigid, integrally formed member. The link member 55 includes a first end portion 57 including a generally cylindrical portion 59 received within a transversely-oriented bore 61 defined by the housing 13 (see FIG. 5). Preferably, the cylindrical portion 59 is closely spaced within the bore 61, thus permitting pivotal movement of the link member 55 relative to the axis of the cylindrical portion 59 and bore 61.

Figure 2:
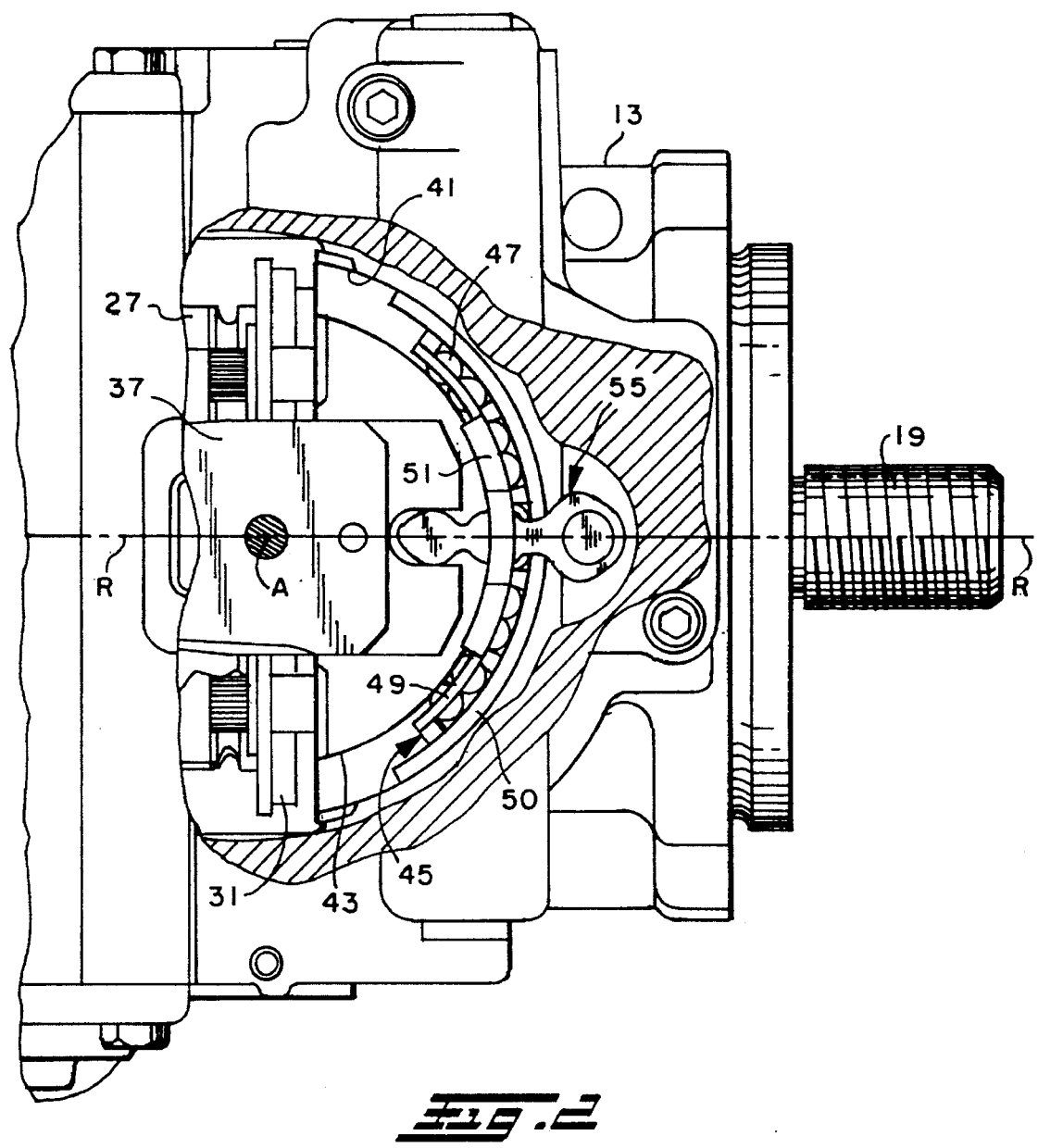
FIG. 2 is a fragmentary, partly broken away side view of the axial piston pump shown in FIG. 1, with the swashplate in the neutral, or centered position.

The swashplate 35 includes an end surface 63 which defines an elongated slot 65 which, as may best be seen in FIG. 2, is aligned with the axis of the pump 11 when the swashplate 35 is in the neutral or zero displacement position. The link member 55 includes a second portion 67 which has a generally cylindrical shape over a major portion thereof. The second portion 67 is disposed within the slot 65 in a close clearance relationship, thus permitting the link member 55 to pivot and slides from the position shown in FIG. 2 to the maximum displacement position shown in FIG. 4. As is well known to those skilled in the art, the maximum displacement position typically involves a tilting of the swashplate 35 through an angle of about 18 degrees.

The link member 55 also includes a clocking portion 69, disposed intermediate the first portion 57 and second portion 67. The clocking portion 69 is also preferably generally cylindrical over a major portion thereof, in the same manner, and for the same reason as for the second portion 67. In other words, it is important for the clocking portion 69 to be in a constant, close clearance relationship within the slot 53 defined by the flange portion 51 as the link member 55 pivots from its neutral position shown in FIG. 2 to its maximum displacement position shown in FIG. 4. As used herein, the term "cylindrical" in reference to portions 59, 67 and 69 will be understood to mean a "cylinder" in which the "diameter" is typically greater than the "height" (or thickness) of the cylinder.

Figure 5:
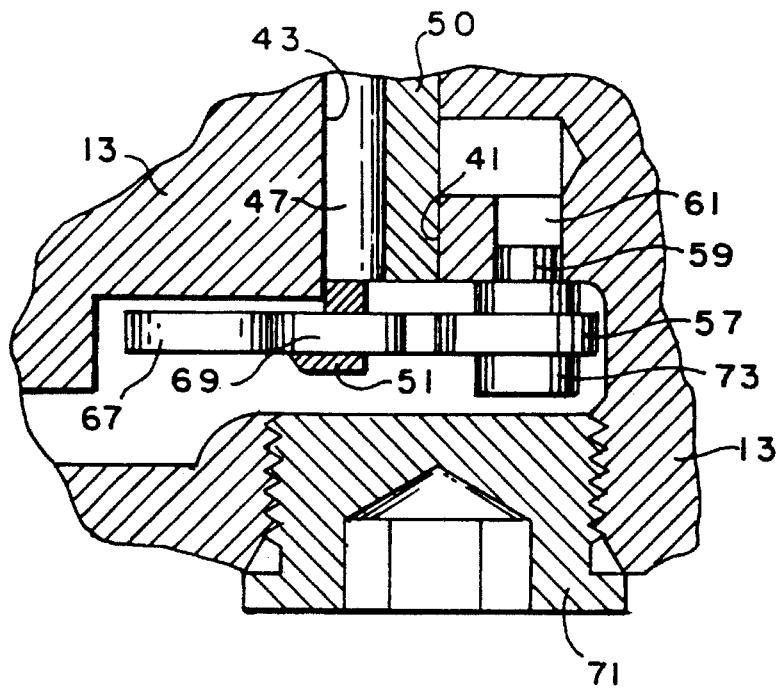
FIG. 5 is an enlarged, fragmentary view, similar to FIG. 1, illustrating the bearing clocking mechanism of the present invention in greater detail.
Figure 6:
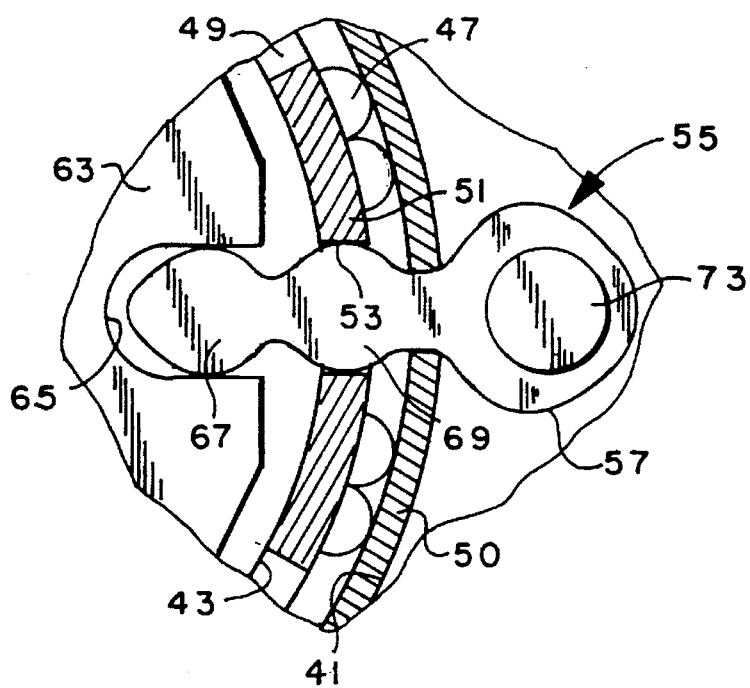
FIG. 6 is an enlarged, fragmentary view, similar to FIG. 2, but with the cage of the bearing broken away to show the slot.

Referring now primarily to FIGS. 1 and 5, the housing 13 includes a pair of threaded bores disposed adjacent the first portion 57 of each of the clocking link members 55. Disposed within each threaded bore is a threaded plug 71, one function of which is to facilitate assembly of each of the bearing clocking assemblies. It should be noted that the assembly procedure to be described is being duplicated on each transverse end of the swashplate 35. With the input shaft 19 oriented vertically downward (and the concave cradle surface 41 thus oriented upward), the clocking link members 55 are put in place, with the cylindrical portions 59 disposed within the bores 61, and with the link member 55 oriented in its neutral position, parallel to the axis of the input shaft 19, as shown in FIGS. 2 and 6 (and therefore, oriented vertically upward during the assembly process). Subsequently, the roller bearing assemblies 45 are set in place within the cradle surface 41 defined by the housing 13. As this is done, the flange portion 51 of the cage 49 passes over, initially, the second portion 67 of the link member 55, and then over the clocking portion 69, until the clocking portion 69 is received within the slot 53 defined by the flange portion 51. Thus, it may be seen that the "diameter" of the cylindrical portion of the second portion 67 cannot be any larger than that of the clocking portion 69, or else it would not be possible to perform the assembly method just described.

After the roller bearing assembly 45 is in place, the entire rotating group is assembled and then lowered into the housing 13. The rotating group is typically understood to include the input shaft 19, the cylinder barrel 23, the piston members 27, and the swashplate 35. When this subassembly is put into the housing, swashplate 35 is set in place, with its convex surface 43 engaging the roller bearings 47, and with the second portion 67 of each link member 55 sliding into its respective elongated slot 65, as shown in FIG. 6. Once the assembly method described above has been completed successfully, as indicated by visual inspection, each of the plugs 71 is threaded into the housing 13, to the positions shown in FIG. 1.

In the subject embodiment, the first portion 57 of the link member 55 also includes, on its "outer" side, a cylindrical portion 73. As may best be seen in FIG. 5, the clearance between the cylindrical portion 73 and the plug 71 is preferably less than the depth of engagement between the cylindrical portion 59 and the bore 61. Thus, disengagement of the link member 55 is prevented, in spite of the extreme simplicity of the bearing clocking arrangement of the invention, and of the method of assembly thereof.

Figure 3:
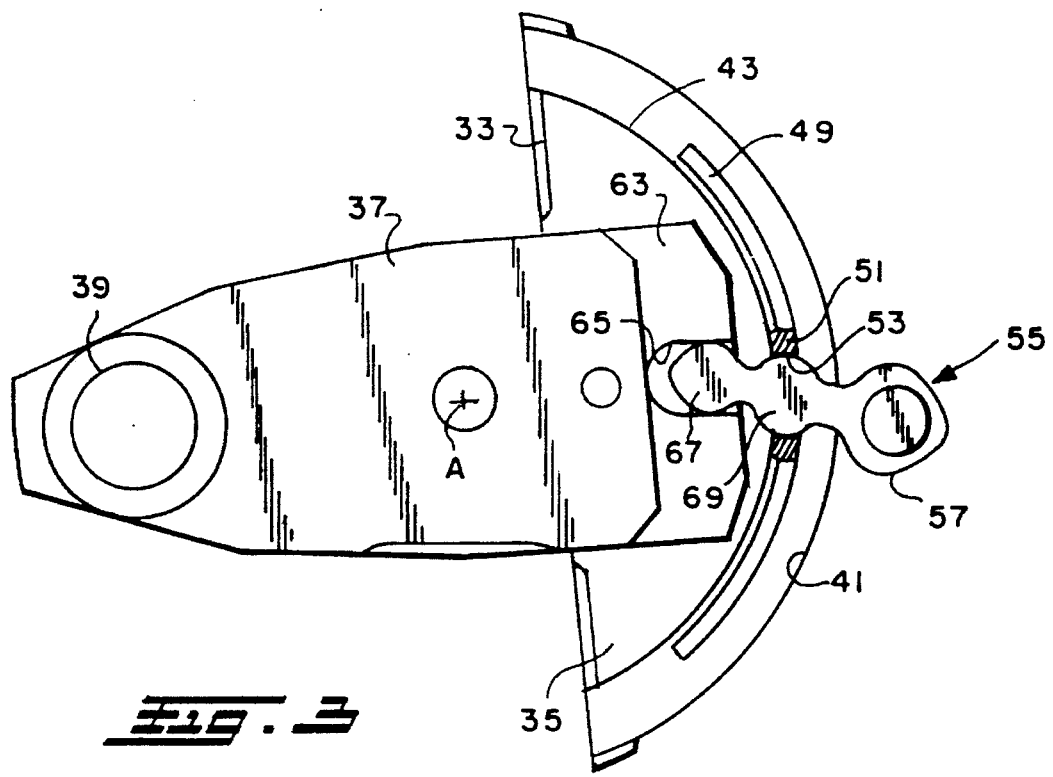
FIG. 3 is a somewhat schematic view, similar to FIG. 2, illustrating the swashplate in a partially displaced position.
Figure 4:
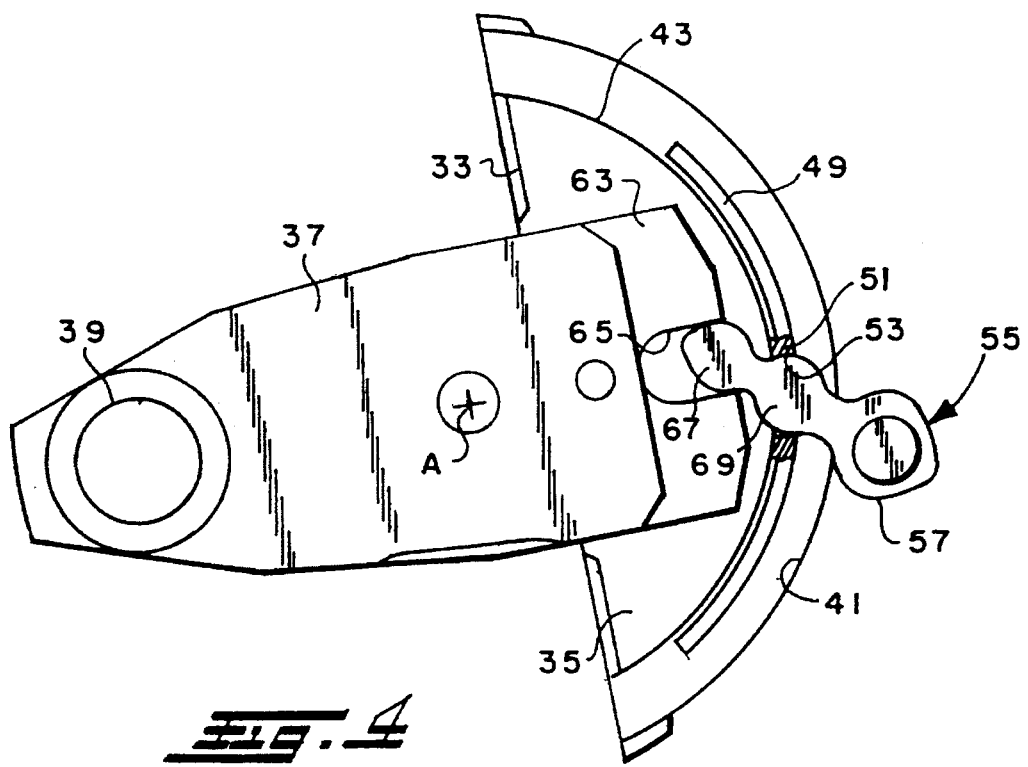
FIG. 4 is a somewhat schematic view, similar to FIG. 3, illustrating the swashplate in a fully displaced position.

Referring now primarily to FIGS. 3 and 4, in conjunction with FIG. 6, as the swashplate 35 is tilted from its neutral position of FIG. 6, toward the partially displaced position (about 9 degrees) of FIG. 3, the link member 55 rotates clockwise about the axes of the cylindrical portion 59 and bore 61. With both the second portion 67 and the clocking portion 69 being cylindrical, over a major portion thereof, the movement of the swashplate 35 and the link member 55 results in the second portion 67 sliding and pivoting within the slot 65, but with no substantial change in the clearance therebetween. At the same time, and in a similar manner, the clocking portion 69 pivots and slides within the slot 53.

In FIG. 4 it may be seen that the swashplate 35 has moved to a fully displaced position, and it is an important aspect of the present invention that the link member 55 and its various portions 67 and 69 be configured such that the close clearance relationships are maintained, even at the fully displaced position. Thus, in view of the rigidity of the link member 55 and the relationships between the portions 67 and 69 and the slots 65 and 53, respectively, the present invention performs the clocking function in a very accurate, repeatable manner, with no substantial opportunity for the bearing assembly 45 to slide between the surfaces 41 and 43. At the same time, the clocking link member 55 is an extremely simple, inexpensive member, as is the method of assembly.

Although the present invention has been illustrated and described in connection with an embodiment in which the "pivot" connection is with the housing 13, it should be understood that the invention is not so limited. Within the scope of the invention, the "pivot" connection could be formed with the swashplate 35 (i.e., the swashplate 35 could define the bore 61), while an end surface of the housing 13 could define the elongated slot 65 for the "pivot and slide" connection.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A variable displacement axial piston hydraulic unit of the type having a housing defining a concave cradle surface; a swashplate disposed in the housing and having a convex surface, a roller bearing assembly disposed between the cradle surface and the convex surface, and including a plurality of roller bearing members intended for purely rolling engagement with the cradle surface and the convex surface as the swashplate is displaced between a neutral position and a maximum displacement position; and a bearing-clocking mechanism including a clocking link member in operable engagement with the housing, the swashplate, and the roller bearing assembly; characterized by:

(a) said clocking link member comprising a single, rigid, unitarily formed link member including first and second end portions and a clocking portion intermediate said first and second end portions;

(b) one of said housing and said swashplate defining a transversely-oriented bore and said first portion of said link member including a cylindrical portion disposed within said bore and closely spaced therein, permitting pivotal movement of said link member about said cylindrical portion;

(c) the other of said housing and said swashplate including an end surface defining an elongated slot, said second portion being slidably disposed within said slot, and being configured to maintain a substantially constant, close clearance within said slot as said swashplate is displaced between said neutral position and said maximum displacement position;

(d) said roller bearing assembly including a cage defining a slot, said clocking portion being rotatably disposed within said slot, and being configured to maintain a substantially constant, close clearance within said slot as said swashplate is displaced between said neutral position and said maximum displacement position.

2. A variable displacement hydraulic unit as claimed in claim 1, characterized by said cage being configured to be in a surrounding relationship, relative to said clocking portion of said link member.

3. A variable displacement hydraulic unit as claimed in claim 1, characterized by said second portion and said clocking portion each being generally cylindrical, and said portions having substantially identical diameters.

4. A variable displacement hydraulic unit as claimed in claim 1, characterized by said housing defining said transversely-oriented bore, and said swashplate defining said elongated slot.

5. A variable displacement hydraulic unit as claimed in claim 1, characterized by said elongated slot and said slot defined by said bearing cage having substantially identical widths.

6. A method of assembling a variable displacement axial piston hydraulic unit of the type having a housing defining an axis of rotation and further defining a concave cradel surface; a swashplate disposed in the housing and having a convex surface, a roller bearing assembly disposed between the cradle surface and the convex surface, and including a plurality of roller bearing members intended for purely rolling engagement with the cradle surface and the convex surface as the swashplate is displaced between a neutral position and a maximum displacement position; and a bearing-clocking mechanism including a clocking link member in operable engagement with the housing, the swashplate, and the roller bearing assembly; the method characterized by the steps of:

(a) providing said housing with a pair of transversely-oriented bores disposed adjacent said cradle surface and oppositely disposed about said axis of rotation;

(b) providing a pair of clocking link members, each comprising a single, rigid, unitarily formed link member having a cylindrical first end portion, a second end portion, and a clocking portion disposed intermediate said first and second end portions, said second end portion and said clocking portion comprising generally identical cylindrical portions;

(c) orienting said housing with said concave cradle surface facing upwardly, inserting said cylindrical first end portions in said transversely-oriented bores, and orienting said clocking link members generally vertically;

(d) providing a pair of bearing assemblies, each comprising a cage defining a slot, then placing said bearing assemblies onto said cradle surface with each slot passing over its respective second end portion and into a close clearance fit with its respective clocking portion; and (e) providing a swashplate including transversely spaced apart end surfaces, each defining an elongated slot opening toward said convex surface of said swashplate, and placing said convex surface into engagement with said bearing assemblies, with each of said second end portions sliding into its respective elongated slot.

* * * * *